United States Patent [19]

Musculus

[11] Patent Number: 5,211,367
[45] Date of Patent: May 18, 1993

[54] SINGLE ARM ARTICULATED KEYBOARD SUPPORT

[75] Inventor: Jeffrey A. Musculus, Wyoming, Mich.

[73] Assignee: Steelcase Inc., Grand Rapids, Mich.

[21] Appl. No.: 778,388

[22] Filed: Oct. 16, 1991

[51] Int. Cl.⁵ .............................................. E04G 3/00
[52] U.S. Cl. ................... 248/279; 248/288.5; 248/575; 248/918; 267/64.12
[58] Field of Search .......... 248/279, 284, 286, 288.5, 248/292.1, 575, 576, 918; 108/69, 75; 267/64.12

[56] References Cited

U.S. PATENT DOCUMENTS

| | | |
|---|---|---|
| 651,539 | 6/1900 | Warren . |
| 1,318,703 | 10/1919 | Stuchlak . |
| 2,510,436 | 6/1950 | Trammell . |
| 2,822,229 | 2/1958 | Carlson ........................ 248/284 X |
| 2,941,776 | 6/1960 | Lauterbach . |
| 3,195,949 | 7/1965 | Mix . |
| 3,211,405 | 10/1965 | Fey et al. . |
| 3,367,616 | 2/1968 | Bausch et al. . |
| 3,433,444 | 3/1969 | Smith . |
| 3,519,236 | 7/1970 | Schmidt et al. . |
| 3,603,543 | 9/1971 | Bottos . |
| 3,778,125 | 12/1973 | Gutmann, Jr. et al. . |
| 3,910,538 | 10/1975 | Baitella . |
| 4,159,092 | 6/1979 | DeLano . |
| 4,183,489 | 1/1980 | Copher et al. . |
| 4,266,747 | 5/1981 | Souder, Jr. et al. . |
| 4,562,987 | 1/1986 | Leeds et al. . |
| 4,573,655 | 3/1986 | Vulic . |
| 4,595,182 | 6/1986 | Freitag et al. ............... 267/64.12 X |
| 4,616,798 | 10/1986 | Smeenge et al. . |
| 4,638,969 | 1/1987 | Brown . |
| 4,645,155 | 2/1987 | Eldon et al. ................. 248/288.5 X |
| 4,706,919 | 11/1987 | Soberalski et al. . |
| 4,708,312 | 11/1987 | Rohr . |
| 4,826,123 | 2/1989 | Hannah et al. ............... 248/281.1 X |
| 5,033,707 | 7/1991 | Strater et al. . |
| 5,037,054 | 8/1991 | McConnell .................... 248/286 X |

FOREIGN PATENT DOCUMENTS

2836655 10/1979 Fed. Rep. of Germany .
60-180029 11/1985 Japan .

Primary Examiner—David A. Scherbel
Assistant Examiner—Derek J. Berger
Attorney, Agent, or Firm—Price, Heneveld, Cooper, DeWitt & Litton

[57] ABSTRACT

An adjustable keyboard support includes a rigid support arm, and a keyboard support pivotally connected to the rigid support arm at a joint comprised of a ball and seat arrangement. The joint includes a retainer that both holds the ball on the seat and further adjustably frictionally engages the ball to resist the rotation of the keyboard support with respect to the support arm during keyboard manipulation. The adjustable keyboard support further includes a mounting bracket slideably and pivotally connected to an associated worksurface, permitting the keyboard to be moved between a raised use position and a retracted storage position. A lift assist is provided to counterbalancing support the weight of a keyboard placed on the keyboard support, and in the preferred embodiment is comprised of a self locking gas strut that automatically locks the arm in a given position. The gas strut attaches to a bracket that can be adjustably moved between high lift force and low lift force positions.

4 Claims, 5 Drawing Sheets

SINGLE ARM ARTICULATED KEYBOARD SUPPORT

BACKGROUND OF THE INVENTION

The present invention pertains to office furniture, and in particular to a keyboard support that adapts furniture for use with a computer.

Computers continue to become increasingly popular in offices and the like, particularly computers having a separate keyboard that can be arranged in an optimum location to maximize efficient and comfortable use while minimizing operator fatigue. However, computer keyboards take up valuable worksurface space. Further, furniture is not always optimally suited or arranged for computer use. For example, the supporting surface may be too low or too high. In particular, it may not be possible to position the keyboard at an ergonomically acceptable height, angle or orientation for each operator which must use the equipment.

One solution is to support the keyboard on an articulating linkage which can be mounted to a desk or worksurface. The articulating linkage allows the keyboard to be adjustably supported in virtually any position desired, and later moved to a hidden storage position. However, these articulating linkages are often quite complex, expensive, heavy, and may not offer the degrees of freedom desired for optimal individual user adjustment. Further, they are often cumbersome to install and use. Still further, some articulating linkages are not retrofitable.

Thus, an improved keyboard support is desired that addresses the aforementioned problems.

SUMMARY OF THE INVENTION

The present invention is embodied in an adjustable keyboard support having a rigid support arm, a mounting bracket pivotally connected to a rearward portion of the support arm and attachable to an associated worksurface, and a keyboard support pivotally connected to the forward portion of the support arm at a joint. The joint includes a retainer that resists rotation of the keyboard support relative to the support arm, but permits manual rotation of the keyboard to facilitate vertical adjustment thereof.

In one form, the joint includes a ball and seat that rotate with respect to each other as the keyboard support is rotated with respect to the support arm.

In another form, the support arm is slideably and rotatably mounted to the associated worksurface permitting virtually infinite adjustability, and also includes a lift assist with a means for adjusting the lift force generated by the lift assist.

The present invention offers several advantages over known art. Since the rigid support arm is pivotally connected to the keyboard support by a joint with retainer having means for resisting rotation, it offers an infinitely adjustable but relatively inexpensive way of providing support for a keyboard. Further, the ball and seat provide a novel joint permitting rotation in any direction about the joint. Still further, the retainer provides a unique means for creating and also increasing the frictional resistance to rotation by the keyboard support about the joint. Notably, the retainer can also be designed to limit the angular rotation of the keyboard support about the joint, thereby preventing overrotation and potential dropping of the keyboard support from the support. Also, a gas strut provides a unique lift assist, and combines with a lift force adjuster bracket to provide a novel lift assist means that can be adjusted between high and low force lift assist positions Further, the gas strut can be self locking to minimize parts and maximize convenience. The overall arrangement is readily adaptable to various worksurfaces, and can be retrofitted on existing furniture. Further, the invention reduces manufacturing cost, yet simplifying assembly and installation while still maintaining the flexibility of use in positioning a keyboard's location and orientation with respect to a worksurface. These and other features, objects and advantages of the present invention will be further understood and appreciated by those skilled in the art upon reading the following description thereof together with reference to the accompanying drawings and claims.

DETAILED DESCRIPTION OF THE PREFERRED EMBODIMENT

The reference numeral 20 generally designates an adjustable keyboard support embodying the present invention. Adjustable keyboard support 20 is particularly adapted to adjustably support a computer keyboard 22 adjacent a worksurface 24, and allows keyboard 22 to be adjusted to an optimum ergonomic position of use by an operator relative to worksurface 24 and items located thereon such as a computer display 26 or papers (not shown) located on worksurface 24. Further, adjustable keyboard support 20 allows keyboard 22 to be moved to a storage position out-of-the-way underneath worksurface 24.

Adjustable keyboard support 20 (FIGS. 2–3) includes a keyboard support or shelf 28, a rigid arm 30 connected to keyboard support 28 by a joint 32 comprised of a ball and seat arrangement, and a mounting bracket 34 for pivotally and slideably connecting rigid arm 30 to the underside of worksurface 24. A gas strut 36 operably mounts to rigid arm 30 and mounting bracket 34 to provide a counterbalancing lift force to support keyboard 22 in a raised or lower position. Mounting bracket 34 includes a lift assist adjuster bracket 38

(FIGS. 9-10) that can be pivoted to change the amount of lift force generated by gas strut 36.

Keyboard support or shelf 28 (FIGS. 4-5) is substantially a tray-like shelf with adjustable sides for securely retaining keyboard 22 thereon. Shelf 28 includes a substantially planar intermediate plate 40 with two spaced holes 42 and 44 near a first edge 46, and an opposite curved edge 48. An elongate bracket 50 is attached near curled edge 48 and parallel thereto to form an inwardly facing slot 52. Two opposing adjustable side brackets 54 and 56 rest on intermediate plate 40 and include an edge 58 that mateably slideably fits within slot 52. Side brackets 54 and 56 further include one or more slots 60 spaced from edge 58 and extending parallel thereto, one of slots 60 aligning with each of holes 42 and 44. A stud 62 with rounded head and square underhead portion 64 is placed through each slot 60 with underhead portion 64 slideably fitting within slot 60. Stud 62 acts to force edge 58 of side brackets 54 and 56 to slideably engage slot 52 as side brackets 54 and 56 are adjusted laterally inwardly or outwardly. Side brackets 54 and 56 include outboard side flanges 66 and 67, respectively, which are adapted to prevent keyboard 22 from sliding laterally sideways off from keyboard support 28.

Figures 4, 5, 6:
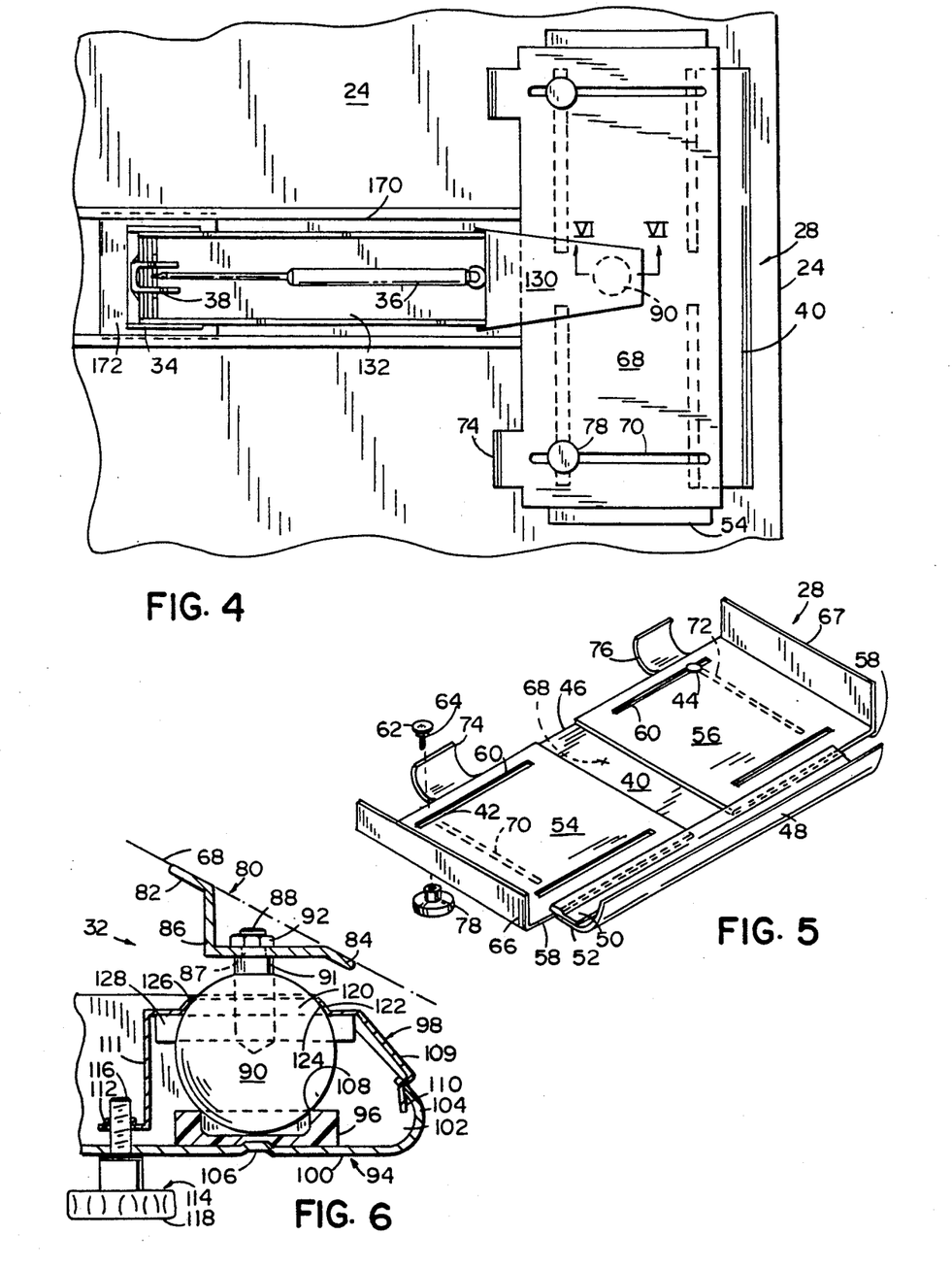
FIG. 4 is a bottom view of the apparatus in FIG. 1.
FIG. 5 is a perspective view of a keyboard support.
FIG. 6 is a sectional side view of a joint taken through the plane VI—VI in FIG. 4.

A bottom plate 68 rests against the underside of intermediate plate 40. Bottom plate 68 is substantially planar and includes two spaced slots 70 and 72 that are aligned with holes 42 and 44 and extend perpendicularly to slots 60. Slots 70 and 72 receive studs 62 and permit bottom plate 68 to be slideably adjusted fore-to-aft on intermediate plate 40. Bottom plate 68 further includes one or more curled flanges such as flanges 74 and 76. Flanges 74 and 76 cooperate with side flanges 66 and 67 and curled edge 48 to bound keyboard 22 on all sides, thereby securely retaining same on keyboard support 28. Due to the lateral adjustability of side brackets 54 and 56 and also bottom plate 68 with respect to intermediate plate 40, flanges 66, 67, 74, 76 and curled edge 48 can be adjustably positioned to accommodate a wide variety of shapes and sizes of keyboards 22. A nut 78 can be threaded onto stud 62 to form a tightenable clamp to frictionally retain plates 40 and 68 and side brackets 54 and 56 together. Preferably, nut 78 includes an enlarged portion that can be used as a handgrip so that nut 78 can be loosened and retightened without tools. Also, preferably, one or more of flanges 66, 67, 74, 76 and curled edge 48 extend a sufficient distance normal to the general plane defined by keyboard support 28 so as to offer protection to keyboard 22 a it is moved to the storage position under worksurface 24, thereby reducing unnecessary damage to keyboard 22.

A shelf support bracket 80 (FIG. 6) is welded to the underside of bottom plate 68 in a centered position so that keyboard 22 and keyboard support 28 are somewhat balanced thereon. Bracket 80 includes flanges 82 and 84 that attach to bottom plate 68, and further includes an offset portion 86 with a hex hole 87 for receiving stud 88. Stud 88 is threaded or pressed into a steel sphere or ball 90 that forms a part of joint 32. A shoulder 91 on stud 88 spaces ball 90 outwardly from bracket 80 and provides increased clearance between bottom plate 68 and joint 32, thereby increasing the range of angles that keyboard support 28 can be tilted to. Stud 88 also includes a hex shaped portion that mateably fits within hex hole 87 to prevent undesirable rotating of stud 88 on bracket 80 which would tend to loosen retaining nut 92, nut 92 threading onto stud 88 to securely retain bracket 80 (i.e. keyboard support 28) to ball 90.

Joint 32 (FIG. 6) is located on a forward end portion 94 of rigid arm 30. End portion 94 includes a bottom wall 100 and sidewalls 102 (only one of which is shown) which form an upwardly oriented U-shaped channel. End portion 94 further includes a curled end flange 104 that extends from the end of bottom wall 100. Also, bottom wall 100 has a protrusion 106 for retaining spacer bearing 96 in place.

Joint 32 (FIG. 6) includes a spacer bearing 96 with socket or seat 108 that mateably engages ball 90 at seat 108, and a retainer 98 that urges ball 90 into engagement with spacer bearing 96 to resist the rotation of ball 90 (and keyboard support 28) relative to spacer bearing 96 (and rigid arm 30). Retainer 98 is made from spring steel or the like, and includes a middle portion with an enlarged hole 120 with flanged seat 122 around the marginal edge thereof. Enlarged hole 120 is sized to receive stud 88 and permit angular movement of stud 88 within hole 120 with flanged seat 122 providing both a frictional contact surface 124 for engaging ball 90 and also a rim 126 for limiting the angular movement of stud 88. Stiffening ribs 128 extend along the sides of retainer 98 and reinforce retainer 98 around hole 120 to prevent undesirable distortion of flanged seat 122. On one end, retainer 98 includes a laterally extending portion 109 having two tabs 110 (only one of which is shown) that engage mating attachment slots in curled end flange 104 of rigid arm end portion 94, allowing retainer 98 to pivot about curled end flange 104.

On the other end of retainer 98 is a laterally extending portion 111 with threaded, extruded hole 112 that cooperates with a lock or tensioner 114 to allow an operator to adjustably increase the tension on retainer 98. In the preferred embodiment, tensioner 114 includes a threaded shaft 116 with handle 118. As tensioner 114 is twisted, retainer 98 increasingly tensions ball 90 into engagement with seat 108 of spacer bearing 96 and flanged seat 122 of retainer 98, thereby increasing the frictional resistance to angular movement of ball 90. Lateral portions 109 and 111 can act as a leaf spring to generate increasing force as tensioner 114 is tightened onto ball 90, but in the preferred form are rigid so that tightening of tensioner 114 locks joint 32 in a given position.

Figure 2:
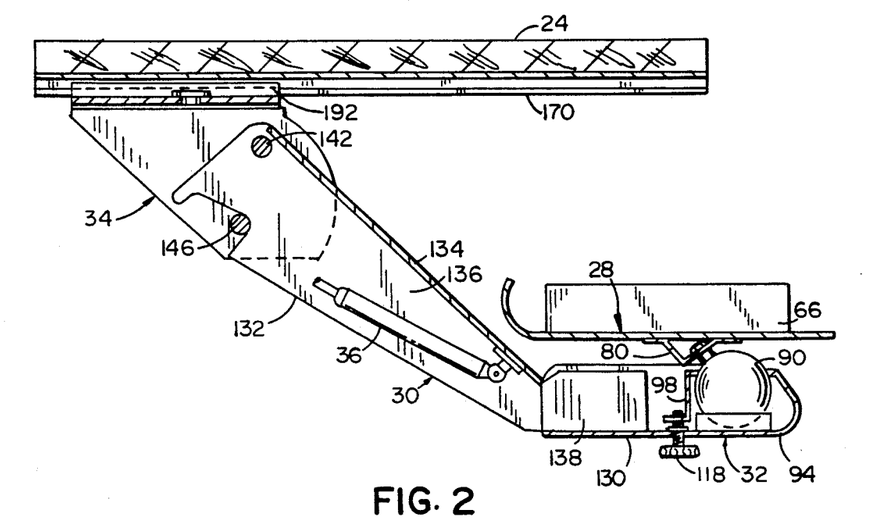
FIG. 2 is a sectional side view of the apparatus in FIG. 1 in a lowered position.
Figure 3:
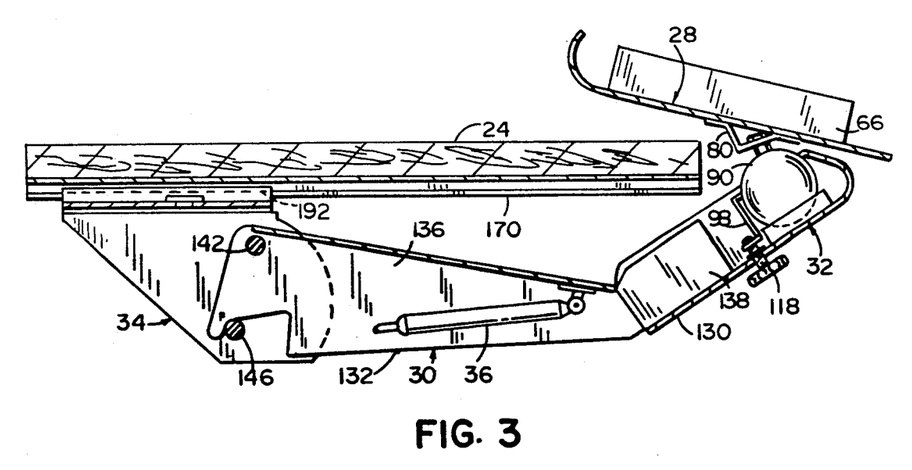
FIG. 3 is a sectional side view of the apparatus in FIG. 1 in a raised position.

As shown in FIGS. 2-3, rigid arm 30 includes a forward portion 130 and a rearward portion 132. Forward portion 130 includes a continuation of bottom wall 100 and sidewalls 102 from end portion 94 such that it forms a beam-like shape defining an upwardly facing U-shaped section along its length. The width of the U-shaped section increases as forward portion 130 approaches rearward portion 132 (FIG. 4) to provide increased resistance to twisting along the longitudinal length of rigid arm 30. By end portion 94 being somewhat narrowed, keyboard support 28 can be tilted to greater angles about ball 90 without bottom plate 68 striking sidewalls 102 of end portion 94 (FIG. 3).

Rearward portion 132 (FIG. 3) forms a downwardly facing U-shaped section as defined by upper wall 134 and sidewalls 136. Sidewalls 136 (only one of which is shown) each include an extension 138 that extends into forward portion 130 adjacent sidewalls 102, extension 138 and sidewalls 102 being spot welded or otherwise rigidly interconnected.

The rear end of rearward portion 132 of rigid arm 30 (FIG. 7) is shaped for attachment to mounting bracket 34. Specifically, sidewalls 136 include a hole 140 for receiving pivot shaft or axle 142, and a notch 144 for receiving a rotation limiting shaft 146. Notch 144 includes a first end 147 for limiting the upward movement of arm 30 and a second end 149 for limiting the downward movement of arm 30.

It is contemplated that a variety of different arrangements can be utilized to lock rigid arm at a given angle to mounting bracket 34. In the preferred embodiment, gas strut 36 is a self locking gas strut such as is sold by Gas Spring Company of Colman, Pa. The self locking gas strut naturally locks arm 30 in a given position until an initial pretension on an internal check valve (not shown) in gas strut 36 is overcome. The internal check valve (not shown) locks the shelf in a given location until an operator pushes down (or pulls up) with more force than the internal check valve is set at. When this happens, arm 30 can then be moved to a desired new location. It is also contemplated that arm 30 could alternatively be held in a fixed location by a clamp adapted to press walls 136 and 154 together in frictional engagement.

Mounting bracket 34 (FIG. 7) includes a top wall 156 and two sidewalls 154 and 158 forming a U-shaped downwardly facing channel for mateably receiving rearward portion 132 of rigid arm 30. Sidewalls 154 and 158 include holes 160 and 162 for receiving shafts 142 and 146. Top wall 156 includes a centered round hole 166 for receiving a swivel stud 168, and an arcuate slot 169 radially spaced from centered hole 166.

Mounting bracket 34 (FIG. 7) is slideably and pivotally mounted to worksurface 24 by use of a track 170 and carriage. In the embodiment shown, the carriage is comprised of a carriage plate or guide bracket 172, carriage plate 172 being slideably mounted to track 170 and pivotally mounted to bracket 34. Track 170 can be attached to the underside of worksurface 24 by a number of means such as by positioning screws 171 in attachment holes 171A. Additionally, track 170 can be a number of different designs, but as illustrated includes inwardly facing opposing slots or guides 174 which receive the outer edges 176 and 178 of carriage plate 172. Solid bearings 180 are placed over edges 176 and 178 to provide a smooth sliding motion within track slots 174 and also to increase the life of the assembly. Solid bearings 180 include a pocket 182 sized to slip over edges 176 and 178, and also include enlarged ends 184 that slidingly engage track slots 174. Carriage plate 172 includes a hole for receiving swivel stud 168, and a protrusion 188 that engages slot 169 and limits the rotation of mounting plate 34 on carriage plate 172. A flat bearing sheet 192 including a hex hole 193 can be placed between carriage plate 172 and mounting bracket 34 to achieve a smooth and pleasing swiveling motion.

Figures 7, 8:
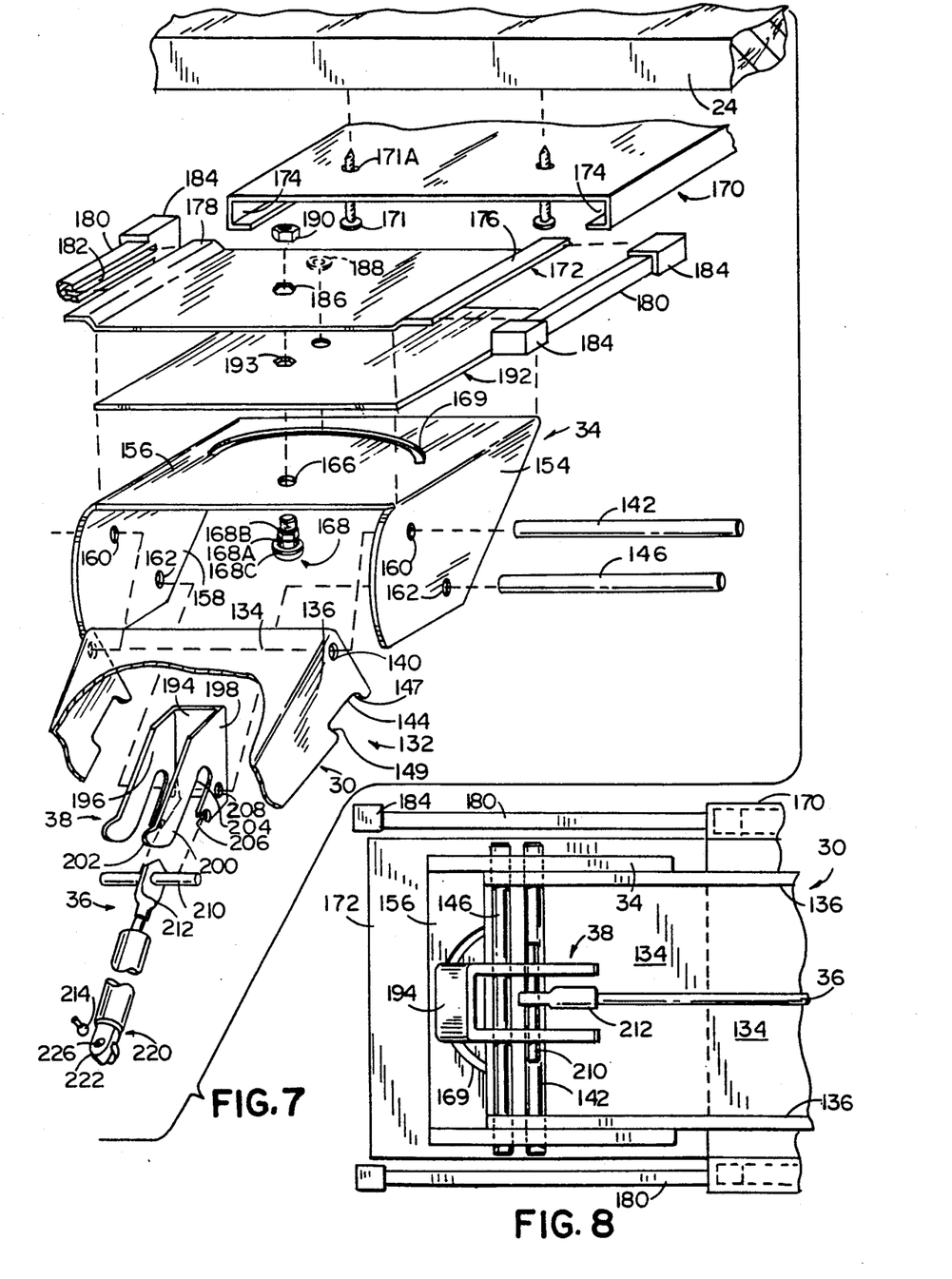
FIG. 7 is an exploded perspective view of the end of the adjustable keyboard support that attaches to the worksurface.
FIG. 8 is an enlarged bottom view of the end of the adjustable keyboard support that attaches to the worksurface, the end of the track being broken-away for clarity.

In the preferred embodiment, swivel stud 168 protrudes slidingly through hole 166 in mounting bracket 34 and into a hex hole 186 in carriage plate 172, and is held in place by a nut 190. Stud 168 is a double shouldered bolt. The first shoulder 168A is round permitting mounting bracket 34 (i.e. hole 166) to rotate on bolt 168. The second shoulder 168B is slightly smaller and is hex shaped. Hex shaped shoulder 168B mateably protrudes through hex holes 193 and 186 holding carriage plate 172 and flat bearing sheet 192 in alignment with each other as arm 30 is rotated. Also under the head of bolt 168 is a special very smooth washer 168C which is included for wear resistance. FIG. 8 is a bottom view of the above noted parts as assembled with track 170 partially broken away to better show solid bearings 180 and simplify the figure.

A lift force adjuster bracket 38 (FIGS. 7 and 8) is also mounted on shaft 146. Adjuster bracket 38 is a U-shaped bracket having identically shaped sidewalls 196 and 198 spaced from each other and connected by a back wall 194. Sidewalls 196 and 198 each include an elongated finger 200 with hook 202 in its outer extremity, slots 204 and 206, and hole 208.

Figure 9:
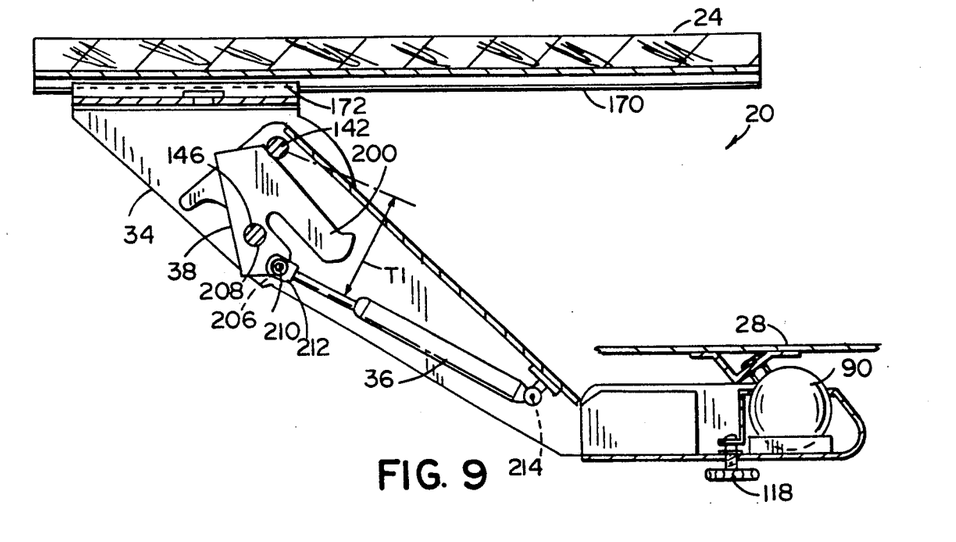
FIG. 9 is a sectional side view of the apparatus in FIG. 1 adjusted to a high counterbalance lift force.
Figures 10, 11, 12:
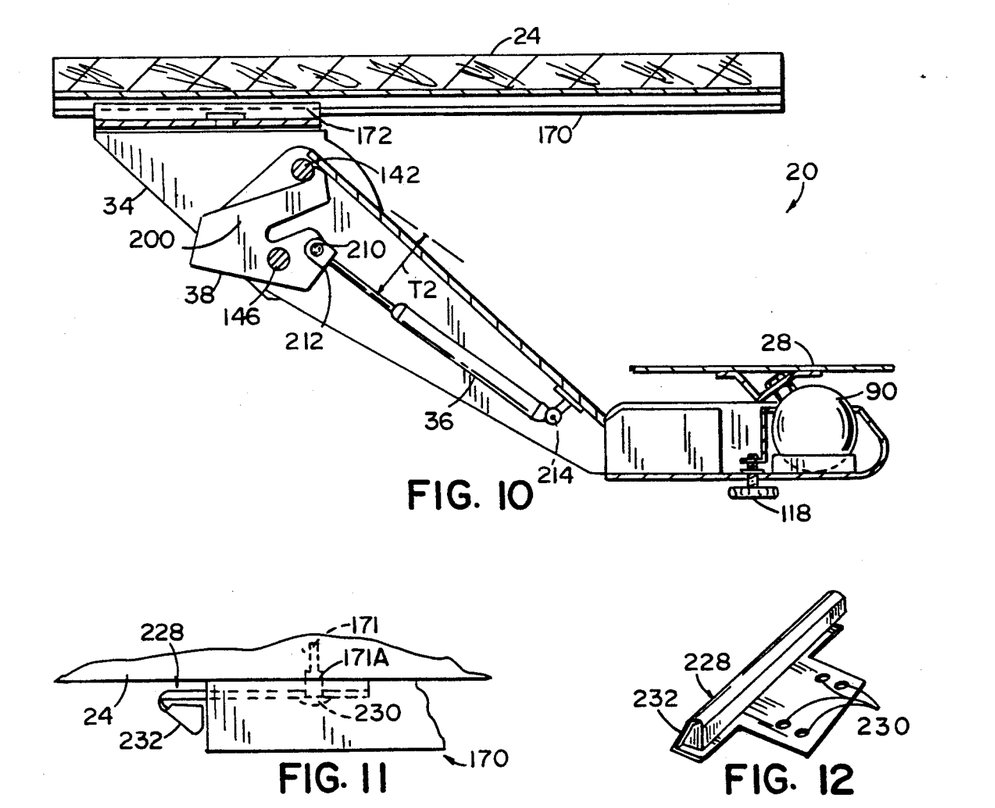
FIG. 10 is a sectional side view of the apparatus in FIG. 1 adjusted to a low counterbalance lift force.
FIG. 11 is a side view of an end of the track.
FIG. 12 is a perspective view of a track end piece.

As best shown in FIGS. 9-10, lift assist adjuster bracket 38 is pivotally mounted by holes 208 on shaft 146 to mounting bracket 34 with the base of finger 200 engaging shaft 142. A lift assist such as gas strut 36 is pivotally mounted at one end on a ball shaped stud 214 to rigid arm 30 such as to upper wall 134, and at the other end to adjuster bracket 38 by engaging a dowel 210 on gas strut end 212 into notch 206. As shown in FIG. 7 gas strut 36 includes an end 220 adapted to capture ball shaped stud 214 yet permit rotation thereon. End 220 includes a pocket 222 for receiving the ball portion of stud 214, and further includes a releasable "C" shaped spring 224 that has opposing free ends 226 that grip the ball of stud 214 when pressed into the retaining position.

As shown in FIG. 9, notch 206 positions gas strut 36 so as to give the lift force generated by gas strut 36 a maximum torque arm "T1" about shaft 142. Thus, a high counterbalance force or torque is generated to assist an operator in lifting keyboard support 28 (and keyboard 22) into a desired raised position.

Alternatively, as shown in FIG. 10, adjuster bracket 38 can be rotated to a position wherein gas strut 36 is given a lesser torque arm "T2". Thus, a lower counterbalance force or torque is generated. Notably, adjuster bracket 38 can be flipped to the desired position during installation and left there during use so that a keyboard operator need not worry about the position of adjuster bracket 38 during normal use. However, when a new keyboard 22 is contemplated having a different weight, a different lift force can be readily achieved.

A track end piece 228 (FIGS. 11 and 12) includes a body with holes 230, and a bumper or stop 232. Holes 230 align with track attachment holes 171A so that end piece 228 can be held in place along with track 170 by screws 171. Bumper 232 abuts carriage plate 172 at its forwardmost location to retain carriage plate 172 in track 170. End piece 228 also facilitate installation of keyboard support 20 by allowing track 170 to be installed under worksurface 24 before insertion of carriage plate 172 into track 170.

In use, adjustable keyboard support 20 is installed and operates in the following manner. Rigid arm 30 is connected to keyboard support 28 at joint 32 (FIG. 6), and tensioner 114 is selectively tightened to provide frictional resistance to pivoting ball 90 on seats 108 and 122. Track 170 is installed to the underside of worksurface 24, and carriage plate 192, mounting bracket 34, and rigid arm 30 are appropriately interconnected (FIG. 7). Bearings 180 are inserted onto the edges of carriage plate 192, and plate 192 is inserted into the end of track 170. Track end piece 228 is then connected to the end of track 170 to secure carriage plate 192 therein. Keyboard support 28 is then adjusted to an optimal size to receive keyboard 22, and adjuster bracket 208 is flipped to the desired high/low lift assist force (FIGS. 9-10). Though only one assembly sequence is described, obviously a number of different assembly sequences are possible.

Figure 1:
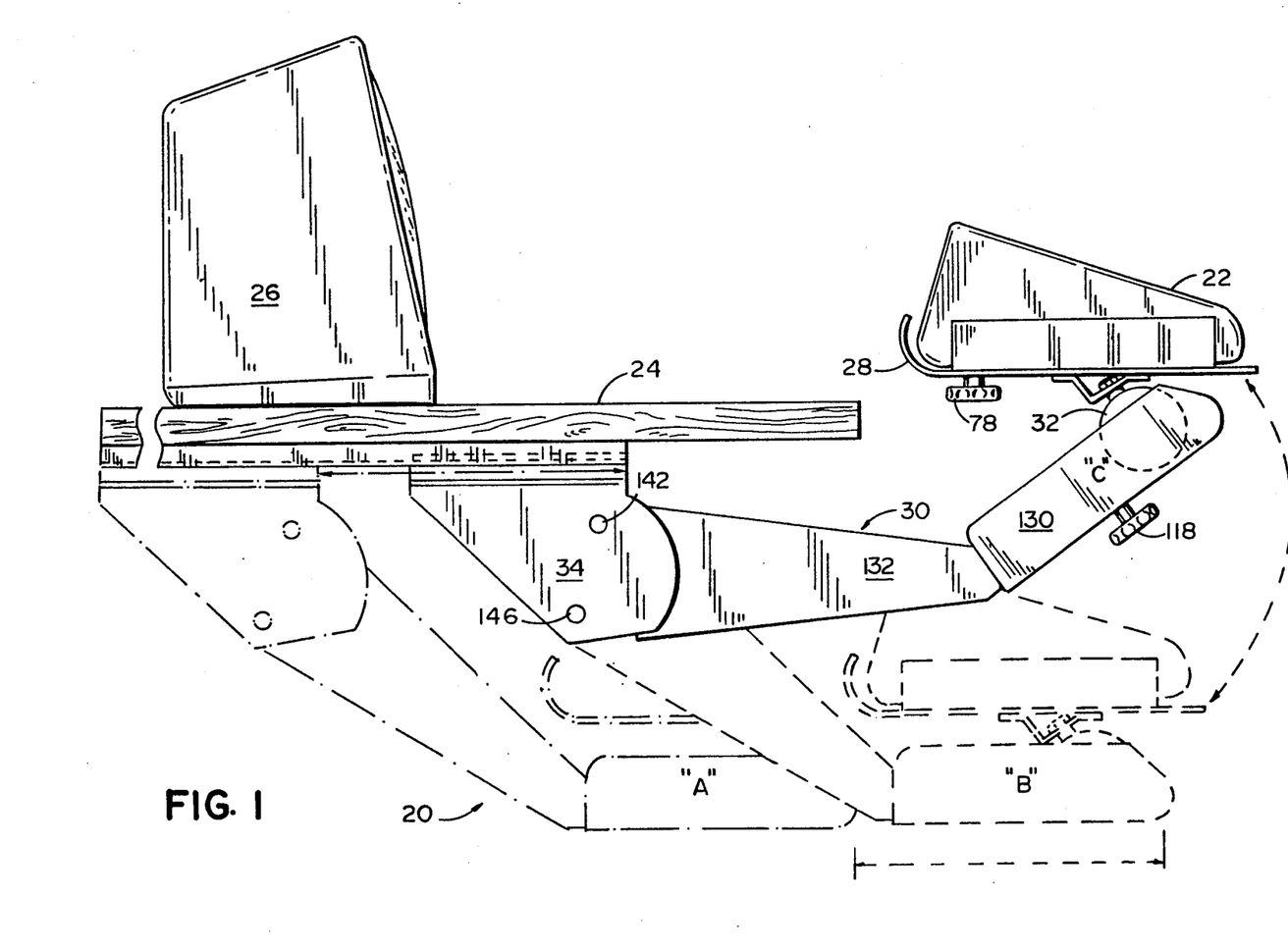
FIG. 1 is a side view of an adjustable keyboard support embodying the present invention, the apparatus shown as attached to a worksurface.

When the operator desires to use keyboard 22, adjustable keyboard support 20 is pulled from retracted storage position "A" (FIG. 1) to the extended but lowered position "B", thus causing carriage plate 172 to slide along track 170. The fore/aft position of carriage plate 172 on track 170 can be held by a number of means (not shown) such as a detent in the forward portion of track 170, by static friction obtained as carriage plate 172 stops moving, or by a twist-lock arrangement.

Keyboard support 28 is then lifted from lowered position "B" to a raised use position "C" by rotating rigid arm 30 about axle shaft 142 on mounting bracket 34 This lifting motion is assisted by self locking gas strut 36 which creates a counterbalance torque on rigid ar 30 to lift keyboard 22 and keyboard support 28, and also locks rigid arm 30 in a given position when forced movement of rigid arm 30 is stopped. The angle of keyboard support 28 can then be manually adjusted by pivoting keyboard support 28 about joint 32 on ball 90. If joint 32 does not adequately hold the position chosen, tensioner 114 can be tightened to increase the frictional resistance of joint 32 to pivotal movement. This adjustment controls both the dynamic frictional resistance to movement about joint 32 to adjust the position of keyboard support 28, and also the static frictional resistance to movement about joint 32 to hold keyboard support 28 in a set position.

In the foregoing description, it will be readily appreciated by those skilled in the art that modifications may be made to the invention without departing from the concepts disclosed herein. Such modifications are to be considered as included in the following claims as interpreted under the Doctrine of Equivalents, unless these claims by their language expressly state otherwise.

The embodiments of the invention in which an exclusive property or privilege is claimed are defined as follows:

1. An adjustable keyboard support for attachment to a worksurface having an underside and a front edge, comprising:
    a single rigid support arm having forward and rearward portions;
    a mounting bracket adapted for attachment to the underside of an associated worksurface;
    means for pivotably connecting the rearward portion of said support arm with said mounting bracket, said means for pivotably connecting defining a vertical axis of rotation and a horizontal axis of rotation;
    means for releasably locking said support arm at a selected position;
    a keyboard support portion configured to securely support a computer keyboard or the like thereon;
    a continuously repositionable ball joint pivotally and rotatably connecting said keyboard support portion with the forward portion of said support arm so that said keyboard support portion can be squared with the front edge of the associated worksurface to facilitate use of a keyboard placed thereon, said joint including a retainer with means for resisting rotation of said keyboard support portion with respect to said support arm during keyboard manipulation, yet permitting manual rotation of said keyboard support portion with respect to said support arm to facilitate vertically angularly and rotatably adjusting said keyboard support portion;
    lift assist means associated with said support arm for assisting in lifting said keyboard support portion, said lift assist means including a gas strut; and
    pivotable bracket means for adjusting the amount of lifting force generated by said lift assist means.

2. An apparatus as set forth in claim 1 wherein said pivotable bracket means for adjusting the amount of lifting force generated by said lift assist means includes a lift assist adjuster bracket operably pivotally connected to said mounting bracket, said gas strut being operably attached to said lift force adjuster bracket so as to define a moment arm for said gas strut around the axis of rotation defined by said means for pivotably connecting said support arm and said mounting bracket, said lift assist adjuster bracket being pivotally movable so as to change the length of said moment arm to control the lifting force generated by said gas strut.

3. An articulated arm arrangement for adjustably supporting keyboards and the like adjacent an associated worksurface, the worksurface having an underside and a front edge, comprising:
    an elongated, rigid support arm having forward and rearward portions;
    a mounting bracket having means for attaching the same to an underside of the worksurface;
    means for pivotably connecting the rearward portion of said support arm with said mounting bracket, so as to permit said support arm to pivot about a horizontally oriented arm pivot axis between a raised position and a lowered position adjacent to the worksurface, and also so as to permit said support arm to pivot about a vertically oriented arm pivot axis from side to side;
    means for locking said support arm at a selected height between said raised and lowered positions;
    a keyboard support portion configured to support a computer keyboard or the like thereon;
    a continuously repositionable swivel joint connecting said keyboard support portion with the forward portion of said support arm in a manner which permits said keyboard to both pivot and rotate with respect to said support arm about both a horizontal axis and a vertical axis, said swivel joint including an adjustable friction retainer which normally resists rotation of said keyboard support portion with respect to said support arm during keyboard manipulation, yet permits selected rotation of said keyboard support portion with respect to said support arm for adjustment so that said keyboard support portion can be squared with the front edge of the associated worksurface, whereby said keyboard support portion is shifted to a selected vertical position by grasping the same, and manually rotating said arm about said arm pivot axis, while maintaining said keyboard support portion in a substantially horizontal orientation, said locking means being adapted to retain said support arm in the selected vertical position, such that upon manual release of said keyboard support portion, said friction retainer automatically prevents inadvertent movement of said keyboard support portion from the set orientation of said keyboard support portion during normal manipulation of the keyboard;
    lift assist means associated with said support arm for assisting in lifting said keyboard support portion, said lift assist means including a gas strut; and
    pivotable bracket means for adjusting the amount of lifting force generated by said lift assist means, said pivotable bracket means for adjusting including a lift assist adjuster bracket that can be moved between first and second positions to change the lifting force generated by said lift assist means.

4. An apparatus as set forth in claim 3 wherein said gas strut is operably attached to said lift assist adjuster bracket so as to define a moment arm for said gas strut around the axis of rotation defined by said means for pivotably connecting said support arm and said mounting bracket, said lift assist adjuster bracket being pivotally movable so as to change the length of said moment arm to control the lifting force generated by said gas strut.

* * * * *